O. ZAHN.
PLANT FOR HEATING THE GAS AND AIR FOR COMBUSTION IN GAS FURNACES.
APPLICATION FILED JAN. 25, 1907.
936,844.
Patented Oct. 12, 1909.
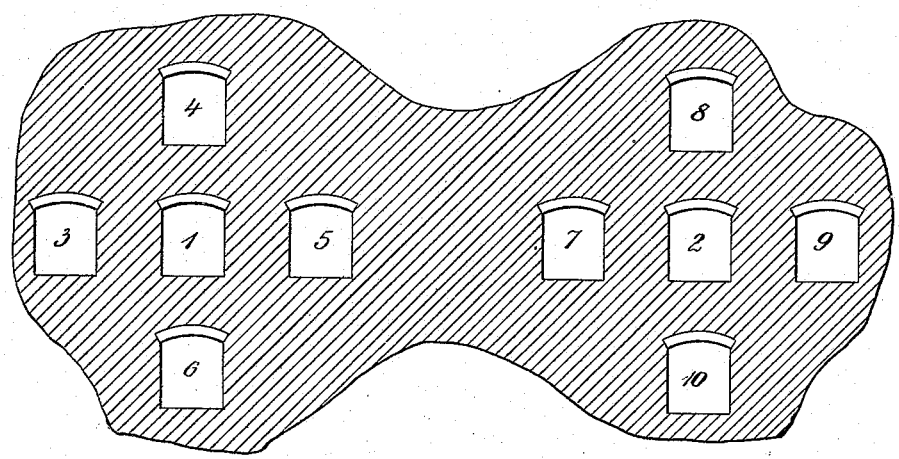
Witnesses
Inventor

UNITED STATES PATENT OFFICE.

OSKAR ZAHN, OF BERLIN, GERMANY.

PLANT FOR HEATING THE GAS AND AIR FOR COMBUSTION IN GAS-FURNACES.

936,844.　　　　　　　　　Specification of Letters Patent.　　　Patented Oct. 12, 1909.

Application filed January 25, 1907. Serial No. 354,043.

*To all whom it may concern:*

Be it known that I, OSKAR ZAHN, engineer, a subject of the Austro-Hungarian Emperor, and residing at 50 Fasanenstrasse, in the city of Berlin, Kingdom of Prussia, and German Empire, have invented certain new and useful Improvements in Plants for Heating the Gas and Air for Combustion in Gas-Furnaces, of which the following is a specification.

My invention relates to a plant for heating the gas and air for combustion in gas furnaces.

According to this invention, two separate systems of flues for heating are provided, of which the one system serves to warm the heating-gas conduit from one or more sides by means of waste-gas, while the other system heats the air-duct from one or more sides, likewise by means of waste-gas.

For warming the heating gas and air, the waste-gas or heat can be used alone. Or instead of the waste-gas, a special source of heat may be employed to warm—if desired by direct flame—the conduit for the heating-gas and the air-ducts. Or the preliminary heating may be effected by the waste-heat or gas in conjunction with a special source of heat. The latter method is to be recommended for all plants in which the waste-heat alone is not sufficient for adequately heating the air and gas, such as is the case with evaporating-pans and the like. For here sufficient heating of the gas and air for insuring smokeless combustion is necessary, since the gases, immediately they strike the colder wall of the pan, are cooled down below the temperature of combustion and therefore give rise to smoke and soot.

The direct heat or flame can be obtained from the same source which heats the furnace, or from some other source. In this manner the plant, to be hereinafter described in detail, for warming the heating-gas and the air necessary for combustion, can also be employed in all those cases in which the waste-heat at disposal is alone insufficient for thorough preheating of the gas and air.

The accompanying drawing shows one form of construction of the invention, the figure being a vertical section.

1 is the air-duct, and 2 the heating-gas conduit. The former is surrounded by four flues 3, 4, 5, 6, through which waste-heat or gas, or direct heat or flame can pass. In like manner the heating-gas conduit 2 is surrounded by four flues 7, 8, 9, 10 through which waste-heat or gas, or direct heat or flame passes. With this arrangement, naturally, not only the heating gas, but also the air necessary for combustion is very thoroughly heated.

Having thus described my invention, I claim as new and desire to secure by Letters Patent:—

In a gas furnace, in combination, a heating gas conduit, and an air duct, and two separate systems of flues, one for heating the incoming gas from one or more sides, and the other for heating the incoming air from one or more sides, substantially as described.

Dated January 10th, 1907.

In witness whereof I have hereunto set my hand in presence of two witnesses.

OSKAR ZAHN.

Witnesses:
　EMIL LUCAS,
　OTTO HENER.